Oct. 24, 1967   J. H. GADDIS   3,348,871
PIPE AND ROD TOOL
Filed Dec. 29, 1965
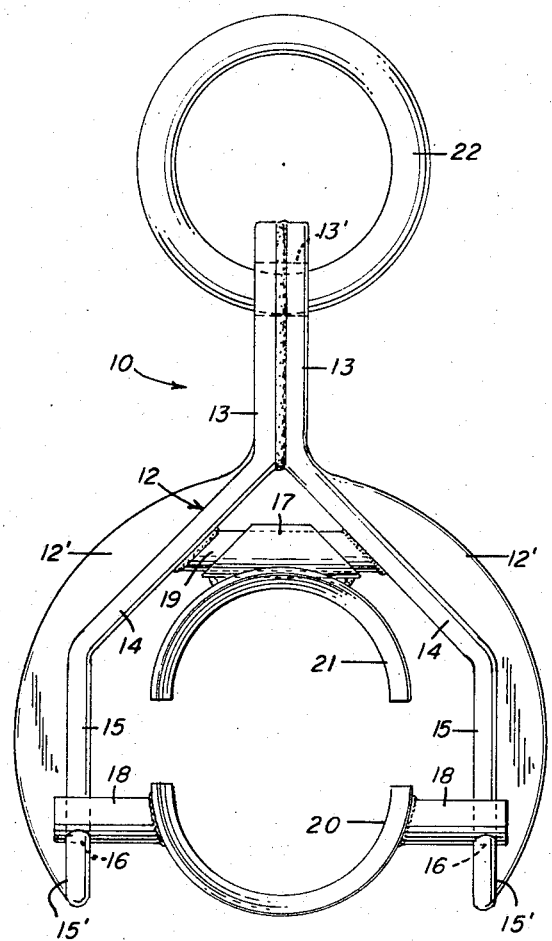
FIG.1
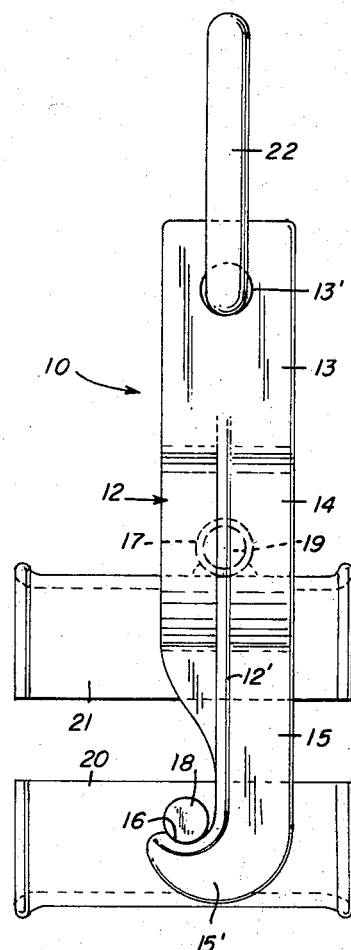
FIG.2
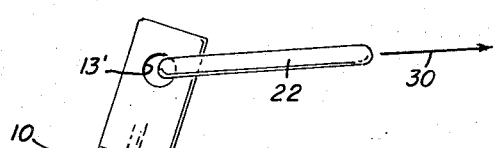
FIG.3
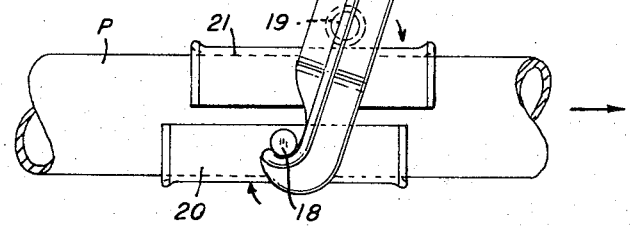
INVENTOR
JOHN H. GADDIS
BY Beale and Jones
ATTORNEYS

3,348,871
PIPE AND ROD TOOL
John H. Gaddis, Tyler, Tex., assignor of one-half to Lawrence J. Daniel, Charlotte, N.C.
Filed Dec. 29, 1965, Ser. No. 517,398
8 Claims. (Cl. 294—92)

My invention is directed to improvements in a pipe and rod puller or pusher.

An object of this invention is to provide a tool for pulling or pushing pipes or rods, coated, wrapped or otherwise lagged especially in distribution and pipeline construction.

Another object of the invention is to provide a pipe or rod puller that provides protection aaginst damage to the pipe or rod coating or wrapping yet assures a firm non-slipping grip on the work.

A further object of the invention is to provide a puller or pusher tool that may be easily applied to a pipe that is located in a ditch or other hard to reach area.

A still further object of the invention is to provide a pulling or pushing tool for pipe or rods that may be slipped along the pipe or rod to a desired position for application of the moving force without removal from the pipe or rod.

Yet another object of the invention is to provide a pipe or rod pusher or puller that may be easily supported in its application to the work and its clamps positioned and set.

A further object of the invention is to provide an easily installed pipe or rod gripper that has a pair of gripping shoes that may be easily changed and may have antifriction gripping surfaces.

Still further objects and the entire scope of applicability of the present invention will become apparent from the detailed description given hereinafter. It should be understood, however, that the detailed description and specific example is given by way of illustration only, and, while indicating a preferred embodiment of the invention, is not given by way of limitation, since various changes and modifications within the spirit and scope of the invention will become apparent to those skilled in the art from this detailed description.

For a more complete understanding of the invention reference may be had to the following drawings, the specification and the claims.

FIG. 1 is an end elevation of the tool;

FIG. 2 is a side view of the tool in FIG. 1 as viewed from the right hand side; and FIG. 3 is a side elevation of the tool on a smaller scale applied to a pipe section and in pulling position.

Throughout the description like reference numbers refer to similar parts.

The puller or pusher for a pipe or rod is generally indicated at 10. It has a lever member 12 provided with an elongated portion 13 having bifurcated lower limb middle portion 14—14 depending therefrom. Each of these lower limb middle portions 14—14 have lower portions 15—15 and hooked lower end bearing portions 15' extending from the lower portions 15—15. The lever 12 is made up of two like portions having the lower ends to provide the bifurcations. The portions 13—13 of the lever 12 are secured together as by welding and an aperture 13' is provided in the upper ends thereof so as to receive a pulling ring 22 to which force may be applied. The elongated portion 13 may have pushing force applied thereto.

The bifurcations 14—14 including their lower portions 15—15 have a transversely disposed reinforcing web 12' which provides stiffening. The outer periphery of this web portion is shaped to form part of a circle. Each of the middle portions 14—14 of the bifurcations extend from the main portion 13—13 so as to form a 45° angle. The lower portions 15—15 extend parallel to each other. The lower hooked end 16 of each lower limb provides a bearing surface for a lower clamp to be described.

Adjacent the main portion 13 of the lever and extending transversely between the bifurcated portion 14—14 is a transverse bearing member 19 which receives a sleeve 17 thereon that carries an upper shoe or saddle 21. The members 17 and 21 form together an upper clamp member.

Received in the hooked lower end bearing portions 16—16 are journals 18—18 attached to the lower shoe or saddle 20 so as to form the lower clamping member. These clamping members 20 and 21 are elongated, as viewed in side elevation in FIGS. 2 and 3, and semicircular in cross section, as viewed on end in FIG. 1. Their ends are formed with exterior beads and the inner portion of each end is curved outwardly so as to provide a smooth surface for sliding the clamps to an adjusted position along the pipe P.

In FIG. 3 the tool is shown attached to the pipe P with the lower clamping member 20 and the upper clamping member 21 pivoting about their respective axes, namely the axis through the journals 18 for the member 20 and the axis through the members 17 and 19 for member 21. Force is applied to the lever rod through the ring 22 indicated at 30 in FIG. 3 and the arrows adjacent the clamping members show the pivotal direction of gripping the pipe P to urge the pipe P to the right. While this illustrates the application of a pulling force to the tool, the force could be applied as a pushing force to the bifurcated lever 12. To release the tool, force is applied in the reverse direction from that illustrated in FIG. 3.

The bifurcated portions are alike and are joined together at their handle portions 13—13 and have lower bifurcated portions 15—15 that extend parallel to each other.

The diameter of the clamping members or shoes 20 and 21 bears a relationship to the distance between the axis through the member 18 and the members 17 and 19 such that the distance between the axes 18 and 19 is about 20% greater than the inside diameter of the shoes or saddle 20 and 21. This relationship gives a relatively good purchase power of the lever to grip the pipe.

The surface of the shoes or saddles 20 and 21 may be roughened as necessary to provide friction engagement. So also the surfaces 20 and 21 may be provided with suitable facing of soft yet tough material such as rubber or compositions of plastic material so that they would have a nonmarring grip on the pipe or rod being pulled or pushed. This type of clamp with suitable lines shoes is very suitable for use on lagged or wrapped pipe as contrasted with wound around chain and other pulling devices which mar and break through the wrapping. An even grip is applied through the elongated shoes 20 and 21 and an equal force is applied to each shoe through the common lever 12 which acts on each shoe to apply equal force to grip the pipe or rod.

The clamp may be easily applied to a pipe or rod by supporting it from the handle 13 or the ring 22 when positioning it into straddling relation on the pipe to be pulled. With the upper portion resting on the pipe the removable saddle 20 is applied to the lower portion of the pipe and installed in the journals 18 within their bearing surfaces 16. Once the shoes or saddles 20 and 21 are installed the tool rests in a fixed position without support. The tool can be easily released through the lever and the shoes 20 and 21 slid along the pipe to a readjusted position for pulling.

Various sizes of these pushing and pulling tools may be made to accommodate various sizes of pipe or rod. The tool may be easily manufactured from steel and is relatively light in weight for the force that may be applied through it to move pipes and rods or the like.

What I claim is:

1. A pipe and rod puller and pusher comprising, in combination, a lever member having an elongated main portion and bifurcated lower limb portions depending therefrom having hooked lower end bearing portions; a transverse bearing member extending between said bifurcated portions at a position proximal to their juncture with the elongated main portion of the lever; an upper clamp member pivotally engaged with said transverse bearing member and having a depending open and elongated shoe portion for engaging an elongated top portion of a pipe or rod to be clamped and pulled; and a lower clamp member having an open and elongated shoe portion for engaging a lower portion of the pipe or rod and journals extending oppositely and transversely from the last mentioned open shoe portion supported in said hooked lower end bearing portions on the bifurcated limb portions of the lever member whereby a pulling force applied to the outer end of the main portion of the lever causes the lever to pivot about the transverse bearing member and the clamp members to tightly grip the pipe or rod being pulled, said upper clamp portion comprising a tubular portion pivotally mounted on said transverse bearing member and said depending open and elongated shoe portion is fixed to said tubular portion.

2. A pipe and rod puller and pusher comprising, in combination, a lever member having an elongated main portion and bifurcated lower limb portions depending therefrom having hooked lower end bearing portions; a transverse bearing member extending between said bifurcated portions at a position proximal to their juncture with the elongated main portion of the lever; an upper clamp member pivotally engaged with said transverse bearing member and having a depending open shoe portion for engaging a top portion of a pipe or rod to be clamped and pulled; and a lower clamp member having an open shoe portion for engaging a lower portion of the pipe or rod and journals extending oppositely and transversely from the last mentioned open shoe portion supported in said hooked lower endbearing portions on the bifurcated limb portion of the lever member whereby a pulling force applied to the outer end of the main portion of the lever causes the lever to pivot about the transverse bearing member and the clamp members to tightly grip the pipe or rod being pulled, said bifurcated limb portions having a transversely extending reinforcing web extending approximately about their extent.

3. A tool according to claim 2 wherein said bifurcated limbs have upper portions diverging at about 45° from each other and outer remaining portions extending generally parallel to each other.

4. A tool according to claim 2 wherein said reinforcing web has its extreme outer portion defined as a part of a circle.

5. A tool according to claim 2 wherein said main portion of the lever is apertured and has a ring extending through said aperture.

6. A tool according to claim 2 wherein said shoes on the upper and lower clamp members are elongated and approximately semicircular in cross section and have external transversely extending beads at each end and arcuate outwardly curving inner portions at each end so as to be readily slidable along the work when released for positioning.

7. A tool according to claim 2 wherein the distance between the pivotal axis of the upper and lower clamps is approximately 20% greater than the inside diameter of each shoe portion of the clamps.

8. A tool according to claim 2 wherein each shoe portion of the clamp has a facing providing a grip on the pipe or rod yet does not mar the surface of the pipe or rod.

References Cited

UNITED STATES PATENTS

| | | | |
|---|---|---|---|
| 278,155 | 5/1883 | Littlefield | 294—104 X |
| 1,475,146 | 11/1923 | Septer | 294—92 |
| 2,097,683 | 11/1937 | Armstrong | 294—92 |

HUGO O. SCHULZ, *Primary Examiner.*

GERALD M. FORLENZA, *Examiner.*

G. F. ABRAHAM, *Assistant Examiner.*